United States Patent
Jania et al.

(10) Patent No.: US 8,229,910 B2
(45) Date of Patent: Jul. 24, 2012

(54) APPARATUS, SYSTEM, AND METHOD FOR AN INLINE DISPLAY OF RELATED BLOG POSTINGS

(75) Inventors: Frank Lawrence Jania, Chapel Hill, NC (US); Darren Mark Shaw, Fareham (GB)

(73) Assignee: International Business Machines Corporation, Armonk, NY (US)

( * ) Notice: Subject to any disclaimer, the term of this patent is extended or adjusted under 35 U.S.C. 154(b) by 347 days.

(21) Appl. No.: 11/682,117

(22) Filed: Mar. 5, 2007

(65) Prior Publication Data

US 2008/0222097 A1    Sep. 11, 2008

(51) Int. Cl.
*G06F 17/30* (2006.01)
(52) U.S. Cl. ........................................ 707/706
(58) Field of Classification Search .............. 707/3–5, 707/999, 706
See application file for complete search history.

(56) References Cited

U.S. PATENT DOCUMENTS

| | | | |
|---|---|---|---|
| 7,512,900 B2 * | 3/2009 | Lynch et al. | 715/825 |
| 2005/0144193 A1 | 6/2005 | Henzinger | 707/103 |
| 2005/0177584 A1 | 8/2005 | Naito et al. | 707/100 |
| 2005/0234904 A1 | 10/2005 | Brill et al. | 707/5 |
| 2006/0004914 A1 | 1/2006 | Kelly et al. | 709/219 |
| 2007/0078854 A1 * | 4/2007 | Naam et al. | 707/9 |
| 2007/0150457 A1 * | 6/2007 | Goldman et al. | 707/3 |
| 2007/0239662 A1 * | 10/2007 | Fontes et al. | 707/2 |
| 2009/0012944 A1 * | 1/2009 | Rodriguez et al. | 707/3 |

* cited by examiner

*Primary Examiner* — Mohammad Ali
*Assistant Examiner* — Huawen Peng
(74) *Attorney, Agent, or Firm* — Kunzler Needham Massey & Thorpe

(57) ABSTRACT

An apparatus, system, and method for an inline display of related blog postings. The apparatus, system, and method include searching a first blog for material common to the first blog and to a second blog and adding a link to the common material in the second blog. The link includes an interactive indicator in the second blog that displays a posting from the first blog that contains the common material in response to selection of the indicator. The apparatus, system, and method include marking each posting in the first blog that contains the common material and that has been displayed in the second blog as having been read.

19 Claims, 6 Drawing Sheets

APPARATUS, SYSTEM, AND METHOD FOR AN INLINE DISPLAY OF RELATED BLOG POSTINGS

BACKGROUND OF THE INVENTION

1. Field of the Invention

This invention relates to related blog postings and more particularly relates to an inline display of related blog postings.

2. Description of the Related Art

A popular feature of the Internet and other intranet sites is a web log or "blog." A blog is typically a website or other accessible location where entries are made in a journal style and displayed in reverse chronological order. Blogs often provide commentary on popular topics such as news, particular subjects, politics, events, etc. A typical blog combines text, images, links to other blogs and websites, file links, photographs, videos, audio files, etc. The word blog can refer to a web log or may also be used as a verb meaning to add an entry or material to a blog.

Blogs are typically hosted by a server, workstation, or computer that is accessible by way of a data network, such as the Internet, a company's intranet, a wide area network ("WAN"), local area network ("LAN"), wireless network, etc. Blogs may be hosted by a blog hosting service and may be on a server that is part of a server farm with multiple servers, data storage devices, etc. Typically, a blog on a server is accessible to a server client. A server client may be a workstation, a laptop computer, a personal digital assistant ("PDA"), a cellular telephone, etc.

A blog posting is an entry by a user at a particular time and is usually time stamped and separated or marked in some way to distinguish the posting from other postings. Often blogs get very long as users add postings. A particular posting that may be of interest to a user may be buried under numerous other, more recent postings. A particular posting may spawn other postings or blogs. Postings that are related by common topic may be called a thread and may add complexity to blogs.

A particular posting, threads, a group of postings, or even an entire blog may be dedicated to a particular topic, discussion, or quote from another blog. A user may visit a particular group of blogs, such as blogs to which the user subscribes, blogs of a particular topic, etc. A user reading a particular group of blogs may wish to read all postings related to a particular topic or posting. This is difficult, however, because currently a user must read through the group of blogs to determine which postings are related. In addition, after having read a particular group of postings on various blogs, when the user returns to read about another topic or posting, the user does not have a way to identify which postings have been read previously.

SUMMARY OF THE INVENTION

From the foregoing discussion, it should be apparent that a need exists for an apparatus, system, and method to add an inline display of related blog postings. Beneficially, such an apparatus, system, and method would search for common material in two or more blogs and then add a link to the common material of a blog that will allow a user to view related postings when the link is selected. In addition, the related postings would be marked as read after being displayed by the link.

The present invention has been developed in response to the present state of the art, and in particular, in response to the problems and needs in the art that have not yet been fully solved by currently available methods to display blog postings. Accordingly, the present invention has been developed to provide an apparatus, system, and method for an inline display of related blog postings that overcome many or all of the above-discussed shortcomings in the art.

A method of the present invention is presented for an inline display of related blog postings. The method in the disclosed embodiments substantially includes the steps necessary to carry out the functions presented above with respect to the operation of the apparatus and system described below. In one embodiment, the method includes searching a first blog for material common to the first blog and to a second blog. The method includes adding a link to the common material in the second blog. The link includes an interactive indicator in the second blog that displays a posting from the first blog that contains the common material in response to selection of the indicator. The method includes marking each posting in the first blog that contains the common material and that has been displayed in the second blog as having been read.

In one embodiment, the common material is text common to the first blog and the second blog. In another embodiment, searching a first blog for material common to the first blog and to a second blog further includes searching postings within the first blog posted after a previous search. In another embodiment, marking each posting in the first blog that contains the common material as having been read includes changing the posting with common material to a color other than a color of surrounding postings with non-common material.

In one embodiment, selecting the link displays each posting that contains the common material. In another embodiment, selecting the link displays a posting with common material in a preview pane, a side bar, a bubble, or a window. In another embodiment, searching a first blog for material common to the first blog and to a second blog further includes searching each blog of a group of blogs. In yet another embodiment, the interactive indicator includes a posting number that includes a quantity of postings containing the common material.

In one embodiment, searching a first blog for material common to the first blog and to a second blog includes searching after the expiration of a preset time period. In another embodiment, searching a first blog for material common to the first blog and to a second blog includes searching postings that have been posted to the first blog after a previous search. The method also may include, in one embodiment, adding a companion link to the common material in the first blog, where the companion link is an interactive indicator in the first blog that displays a posting from the second blog that contains the common material in response to selection of the indicator. In one embodiment, the method includes determining customer blogging requirements and installing a computer program for an inline display of blog postings where the computer program includes the steps of the method. In one embodiment, the common material includes at least text, an image, a file, and a link.

An apparatus for an inline display of related blog postings is provided with a plurality of modules configured to functionally execute the necessary steps of searching a first blog for material in common with a second blog, adding a link to the common material of the second blog to display a posting of the first blog containing the common material, and marking the posting of the second blog as having been read after being displayed in the second blog. These modules in the described embodiments include a search module that searches a first blog for material common to the first blog and to a second blog. A linking module is included to add a link to the common material in the second blog. The link includes an interactive indicator in the second blog that displays a posting from the first blog that contains the common material in response to selection of the indicator. A mark-as-read module is included to mark each posting in the first blog that contains the common material and that has been displayed in the second blog as having been read.

The apparatus, in one embodiment, is configured to include a blog grouping module that identifies a group of blogs and the search module searches blogs in the group of blogs for common material. In another embodiment, the search module includes a refresh module configured with a refresh time such that the search module searches the first blog at the expiration of the refresh time.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
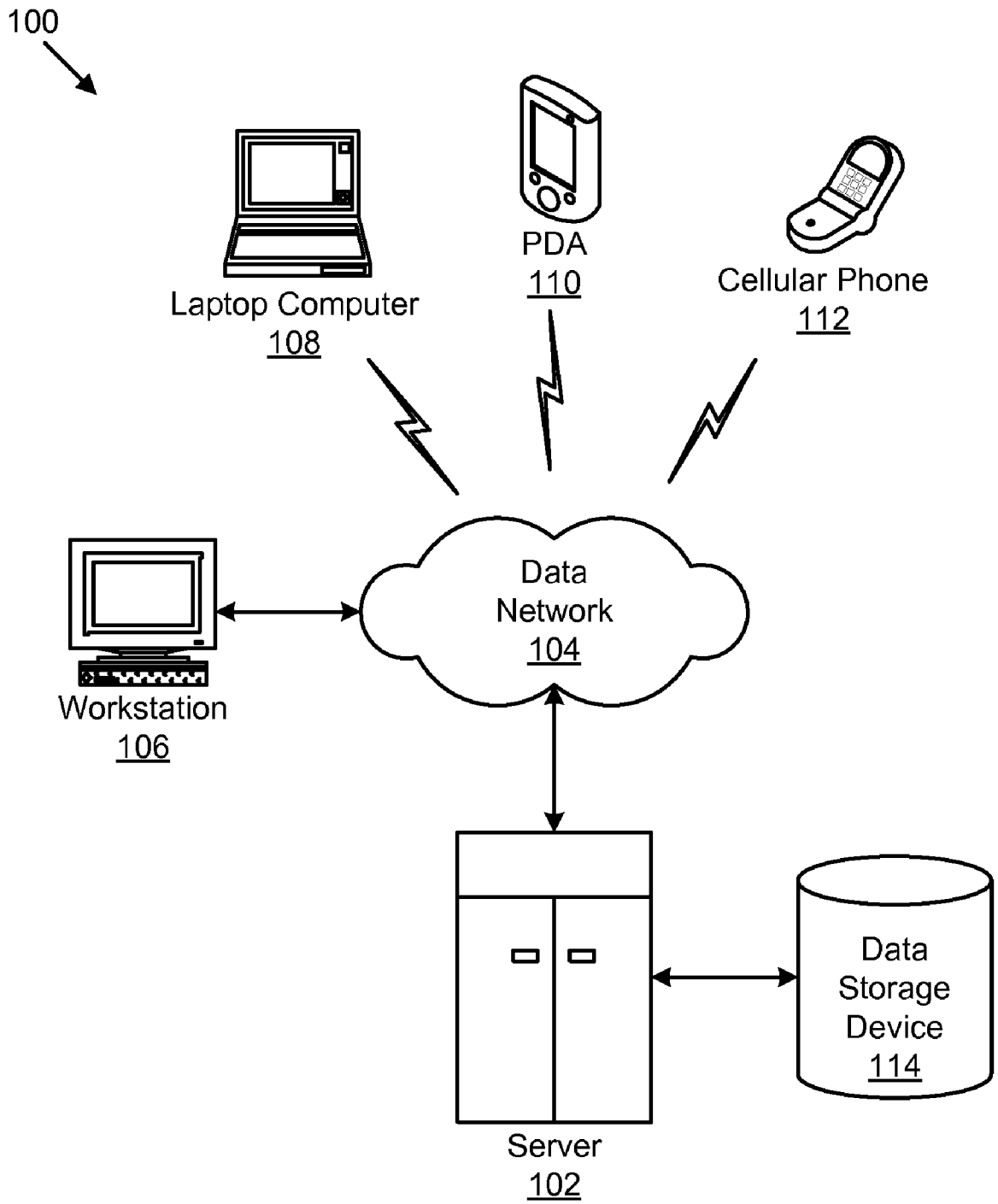
FIG. 1 is a schematic block diagram illustrating one embodiment of a system for an inline display of related blog postings in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take form capable of causing execution of a program of machine-readable instructions on a digital processing apparatus. A computer readable medium may be embodied by a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 is a schematic block diagram illustrating one embodiment of a system 100 for an inline display of related blog postings in accordance with the present invention. The system 100 includes a server 102 in communication through a data network 104 to server clients, such as a workstation 106, a laptop computer 108, a personal digital assistant ("PDA") 110, and a cellular telephone 112. In one embodiment, the server 102 is connected to a data storage device 114. The components of the system 100 are described below.

In one embodiment, the system 100 includes a server 102 in communication with one or more server clients over a data network 104. The server 102 includes at least a first and a second blog. The server 102 may be part of a blog hosting service and may include numerous blogs. The server 102 may include one or more data storage devices 114, possibly accessible through a storage area network ("SAN"), routers, hubs, computers, etc. configured to be accessible to server clients for accessing one or more blogs.

In another embodiment, the system 100 includes at least two servers 102, each with at least one blog, in communication over the data network 104. One or more of the servers 102, may also be personal computers, workstations, laptop computers, etc. The server 102 or servers 102 of the system 100 are configured to include at least two blogs that may be updated with postings, accessed, searched, modified, etc. In one embodiment, the one or more servers 102 are accessible to server clients. In another embodiment, the one or more servers 102 may be accessed through a user interface that is part of each server 102. A user interface may include a keyboard, a mouse, a monitor, a touch screen, etc. One of skill in the art will recognize other configurations of servers 102 or other computers that include at least two blogs that are accessible and able to be updated with postings.

In one embodiment, the system 100 includes server client that is a workstation 106 connected to the server 102 through the data network 104. Additionally, the system 100 may include one or more server clients connected wirelessly or hard wired to the server 102. For example, a server client may include a laptop computer 108, a PDA 110, a cellular telephone 112, etc. The server clients may be used to access blogs. In one embodiment, the server 102 and/or server clients provide application services, web services, mail services, data storage services, and communication services, wherein the services are utilized to support operations of the invention described herein. Additionally, the server 102 and/or server clients may host an apparatus, software application, or the like to perform certain operations of the disclosed invention.

In one embodiment, a single server 102 or server client may provide some or all of theses services. Alternatively, a plurality of servers 102 and/or server clients may be connected and perform these services individually.

In one embodiment, the data storage device 114 stores data for use by the server 102. The data storage device 114 may be remote to the server 102. Alternatively, the data storage device 114 may reside on the server 102. The data storage device 114 may include a storage controller, data storage devices such as magnetic or optical storage disks, data input/output ("I/O") controls, and the like.

Data may be exchanged over the data network 104. In one embodiment, the data network 104 includes a Local Area Network ("LAN"). Alternatively, the data network 104 may include a wireless LAN, a Wide Area Network ("WAN"), the internet, a cellular data communication network, a Very Small Aperture Terminal ("VSAT"), combination of networks, and the like.

In one embodiment, the server clients may access an application, apparatus, service, or the like hosted by the server 102. The server 102 may provide full or limited access for the clients on a full or limited rights basis, wherein the rights are determined by predefined user policies. For example, a workstation 106 may be used for intra-office access to a blog on the server 102. A laptop computer 108 or PDA 110 may be used to remotely access a blog on the server 102. Additionally, a cellular telephone 112 or pager with text messaging services may be used communicate information with a blog on the server 102.

Figure 2:
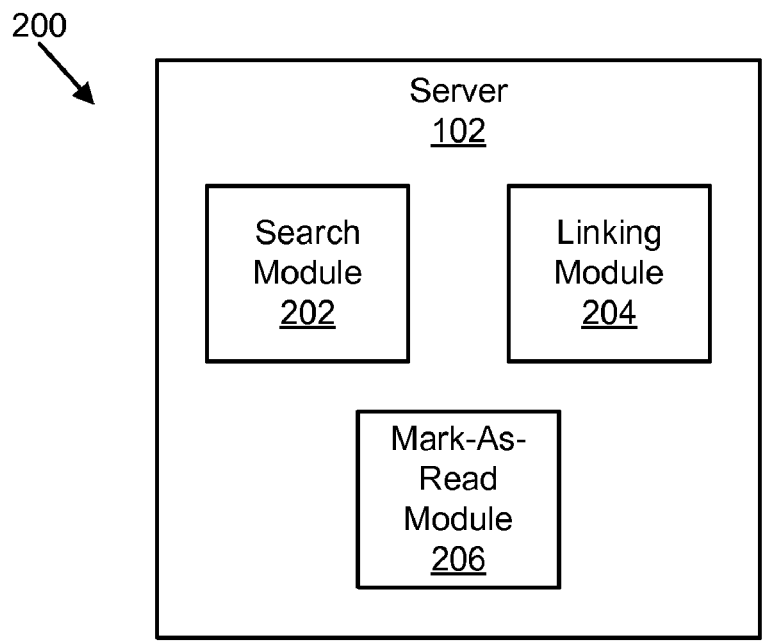
FIG. 2 is a schematic block diagram illustrating one embodiment of an apparatus for an inline display of related blog postings in accordance with the present invention.

FIG. 2 is a schematic block diagram illustrating one embodiment of an apparatus 200 for an inline display of related blog postings in accordance with the present invention. The apparatus 200 includes a search module 202, a linking module 204, and a mark-as-read module 206, which are described below. The apparatus 200, as depicted, may be included on a server 102, but may also be included on a server client. In one embodiment, the apparatus 200 is included on a server 102 and is controlled by a server client.

The apparatus 200 includes a search module 202 that searches a first blog for material common to the first blog and to a second blog. The common material typically includes text, but may also include other material that may be part of a blog. For example, the common material may include an image, an attached file, a link, a video link or file, an audio link or file, etc. In one embodiment, the search module 202 searches for an exact match of common material, such as an exact match of text, file, image, or link.

In another embodiment, the search module 202 searches for an approximate match of common material. For example, the search module 202 may search for text from a blog that may include certain key words. In another embodiment, the search module 202 searches for certain words in the same order in both blogs. In yet another embodiment, the search module 202 excludes less important words, such as "and," "the," "that," "in," "to," etc. In one embodiment, the search module 202 is configurable and allows a user to choose a minimum size for common material, matching criteria, etc.

In one embodiment, the search module 202 searches multiple blogs (first blog) for material in common with a reference blog (second blog). When the search module 202 finds material in a searched blog that is common with material in the reference blog, the search module 202 identifies the common material in the searched blog along with identifiers necessary to reference or link the searched blog and the common material within the searched blog.

The search module 202 may search an entire blog or a portion of a blog. Preferably, the search module 202 searches postings that have been posted to a searched blog since a previous search. In another embodiment, the search module 202 searches all new material posted to a blog since a previous search. Beneficially, searching only new postings or new material decreases computing resources dedicated to a search. The search module 202 may include a commonly available search engine known to those of skill in the art. One of skill in the art will recognize other ways that the search module 202 may search for material in one or more searched blogs that is common with material in a second or reference blog.

The apparatus 200 includes a linking module 204 that adds a link to the common material in the second blog. Typically, the link references a posting in the first blog that includes the common material. In another embodiment, the link references just the common material of the first blog. In yet another embodiment, the link references the entire first blog. The linking module 204 may also add more than one link to the second blog. Each link preferably references a posting or other portion of a searched blog that contains the common material. For example, a paragraph of text of the second blog may be found in blog A so that the linking module 204 links a posting in blog A containing the paragraph to the paragraph in the second blog. In addition, a sentence of the second blog may be found in blog B so that the linking module 204 links a posting in blog B containing the sentence to the sentence in the second blog.

In one embodiment, the linking module 204 adds an interactive indicator to the link in the second blog. In one embodiment, the interactive indicator displays a posting from the first blog that contains the common material in response to selection of the indicator. For example, the interactive indicator may be a marker, symbol, bubble, highlighted text, underlined text, etc. or some other way to identify common material in the second blog that is also found in a searched, first blog and that allows a user to select the indicator and activate the link. For example, the interactive indicator may include a bubble located in the second blog and associated with text and/or material identified by the search module 202 to be common to the first and second blogs. The bubble may be located, for example, at the end of the common text or next to a common image or link. The bubble may be selected by a user clicking on the bubble, or by pausing a pointer of a mouse over the bubble. The link may then display a posting in the first blog that includes the common material or text.

In one embodiment, the interactive indicator includes underlining, italicizing, displaying as bold, etc. the common material or text. In another embodiment, the interactive indicator includes changing the color of the common material or text to a color different than surrounding material or text. A user may then select the indicator by clicking on the common text or material, highlighting the text or material, placing the cursor in the text and pressing a return key, or other suitable selection method.

In one embodiment, the interactive indicator displays the number of links to postings in other blogs that contain the common material. For example, if three postings contain common material, an interactive indicator linked to the common material may display a "3". Once the indicator is selected, the three posting are displayed. In another embodiment, the interactive indicator is shaped to indicate a number of links to postings in other blogs that contain the common material. For example, if the interactive indicator is a bubble, the bubble may increase in size based on the number of linked postings with common material. Typically, the bubble would have an upper limit such that the bubble would not expand beyond a certain size although the number of links may continue to increase.

After selecting the text or material, the linked material from the first blog is displayed. The linked material may be a posting with the common material, a posting with the common material plus surrounding postings, the common material and surrounding text, an entire blog, etc. In one embodiment, the linked material is displayed in an expanded bubble. The expanded bubble may display all or a portion of the linked material and may include an ability to scroll through the linked material. In another embodiment, the linked material is displayed in another window. In another embodiment, the linked material is displayed in a reading pane or side bar. One of skill in the art will recognize other ways to display linked material in response to selecting an interactive indicator of a link.

The search module 202 and linking module 204 may, in one embodiment, be assigned a reference blog (second blog) and one or more search blogs (first blog) and add links only to the reference blog. In another embodiment, the search module 202 sequentially searches blogs, where each blog sequentially serves as a reference blog and one or more other blogs serve as search blogs. The linking module 204 then acts accordingly to add links to the reference blogs. In another embodiment, the linking module 204 adds a link to both the reference and search blogs. The link in a second blog, for example, may contain a link to one or more postings with the common material of a first blog. In addition, the link in the first blog may contain a link to one or more postings with the common material of the second blog. Bi-directional linking may save computing resources such that the search module 202 and linking module 204 may be more efficient.

The apparatus 200 includes a mark-as-read module 206 that marks each posting in the first blog that contains the common material and that has been displayed in the second blog as having been read. After a user selects a indicator and a posting from the first blog that contains common material is displayed in the second blog, the mark-as read module 206 marks the posting with the common material in the first blog as having been read. In this way, when the user opens the first blog, the posting will appear as having been read and the user does not have to waste time re-reading the posting that has been previously read. Selecting the tags in the second blog and reading associated postings allows a convenient way for a user to read blog postings discussing common material at the same time. The user may then skip the postings when opening and reading other searched blogs.

In one embodiment, the mark-as-read module 206 changes the color of the posting with common material in the first blog to a color normally associated with text that has been read or previously accessed. For example, the posting may be colored blue initially, and magenta after the mark-as-read module 206 marks the posting as having been read. In another embodiment, the mark-as read module 206 adds an indicator to a posting so that a user identifies the posting as having been read. For example, a posting may have an open check box if it has not been accessed, opened, etc. and then may include a check box with a checkmark if it has been read. The mark-as-read module 206 may add the checked check box even if a user has not opened or accessed the posting, but the posting has been displayed in another blog through a link added by the linking module 204. The mark-as-read module 206 identifies a posting displayed previously in the second blog as having been read in such a way that a user will understand that the posting is marked as read and need not read the posting a second time if desired. One of skill in the art will recognize other ways that the mark-as-read module 206 may mark a posting as having been read after the posting has been previously displayed in another blog that links to the posting.

Figure 3:
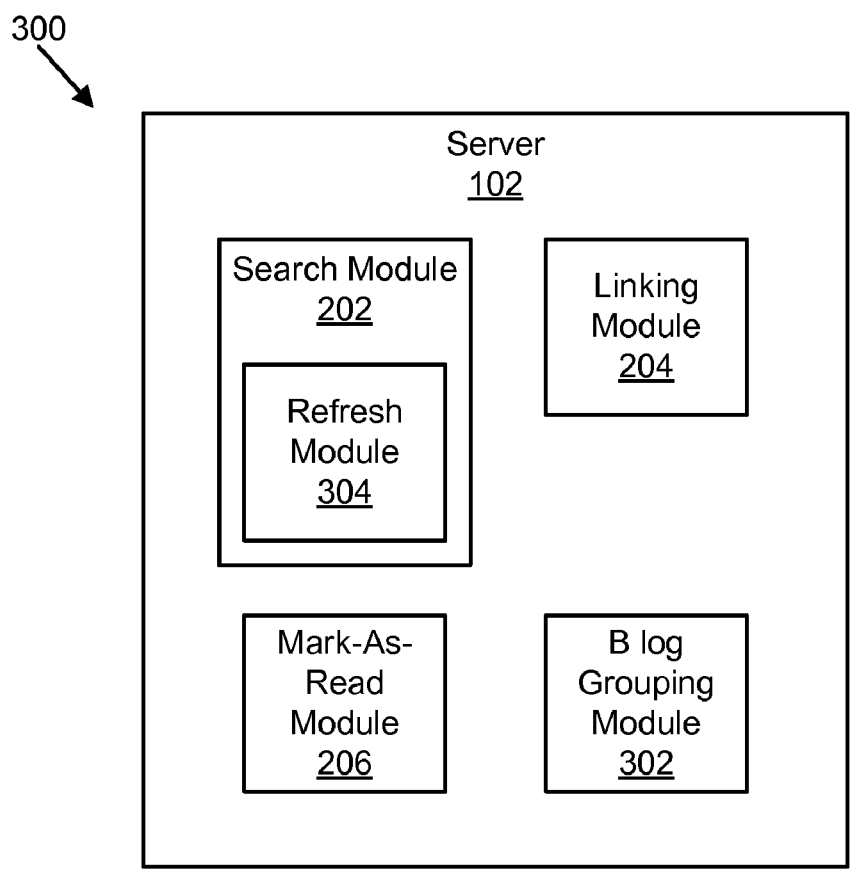
FIG. 3 is a schematic block diagram illustrating an alternate embodiment of an apparatus for an inline display of related blog postings in accordance with the present invention.

FIG. 3 is a schematic block diagram illustrating an alternate embodiment of an apparatus 300 for an inline display of related blog postings in accordance with the present invention. The apparatus 300 includes a search module 202, a linking module 204, and a mark-as-read module 206, which are substantially similar to the modules described in relation to the apparatus 200 of FIG. 2. The apparatus 300 also includes a blog grouping module 302, and the search module 202 includes a refresh module 304, which are described below.

The apparatus 300 includes a blog grouping module 302 that identifies a group of blogs and the search module 202 searches blogs in the group of blogs for common material. The blog grouping module 302 identifies a group of blogs for the search module 202 to search for common material. For example, the blog grouping module 302 may identify a group of blogs to be blogs to which a user subscribes. In another example, the blog grouping module 302 identifies a group of blogs to be the blogs available through a blog hosting service. In another example, the blog grouping module 302 identifies a group of blogs to be blogs in a list. In another example, the blog grouping module 302 searches a topic associated with a blog, blog posting, group of postings, etc. to identify related blogs to be searched by the search module 202. In yet another example, the blog grouping module 302 searches blogs accessed through a linked blog.

The group of blogs may be saved in a file, spread sheet, database, list, etc. The search module 202 accesses the group and searches the group of blogs. By limiting a search to a finite group of blogs, beneficially the search module 202 may be able to efficiently search blogs without overburdening computing resources. In another embodiment, the search module 202 performs a wide-scale search of the Internet for blogs that contain postings with common material. While such an open ended search may require a limitation of computer resources used by the search module 202, the search may be useful to identify blogs that may have been unknown to a user that are related in some way to a reference blog. One of skill in the art will recognize other ways that the blog grouping module 302 can identify a group of blogs for the search module 202 to search for postings with material common to a reference blog.

The apparatus 300 includes, in one embodiment, a search module 202 with a refresh module 304 that includes a refresh time. The search module 202 searches the first blog at the expiration of each refresh time. In another embodiment, the search module 202 searches a group of blogs identified by the blog grouping module 302 at the expiration of the refresh time. Typically, the refresh time is chosen to not overburden computing resources while searching often enough to not miss updates to blogs of interest. For example, a typical refresh time may be 30 minutes and the search module 202 will conduct a search every 30 minutes.

In another embodiment, the search module 202 manually searches one or more blogs when directed by a user. In another embodiment, the search module 202 searches one or more blogs automatically according to the refresh time. In yet another embodiment, the search module 202 searches one or more blogs when triggered by another application or program. One of skill in the art will recognize other ways that the search module 202 may use a refresh module 304 or other means to trigger a search of one or more blogs.

Figure 4:
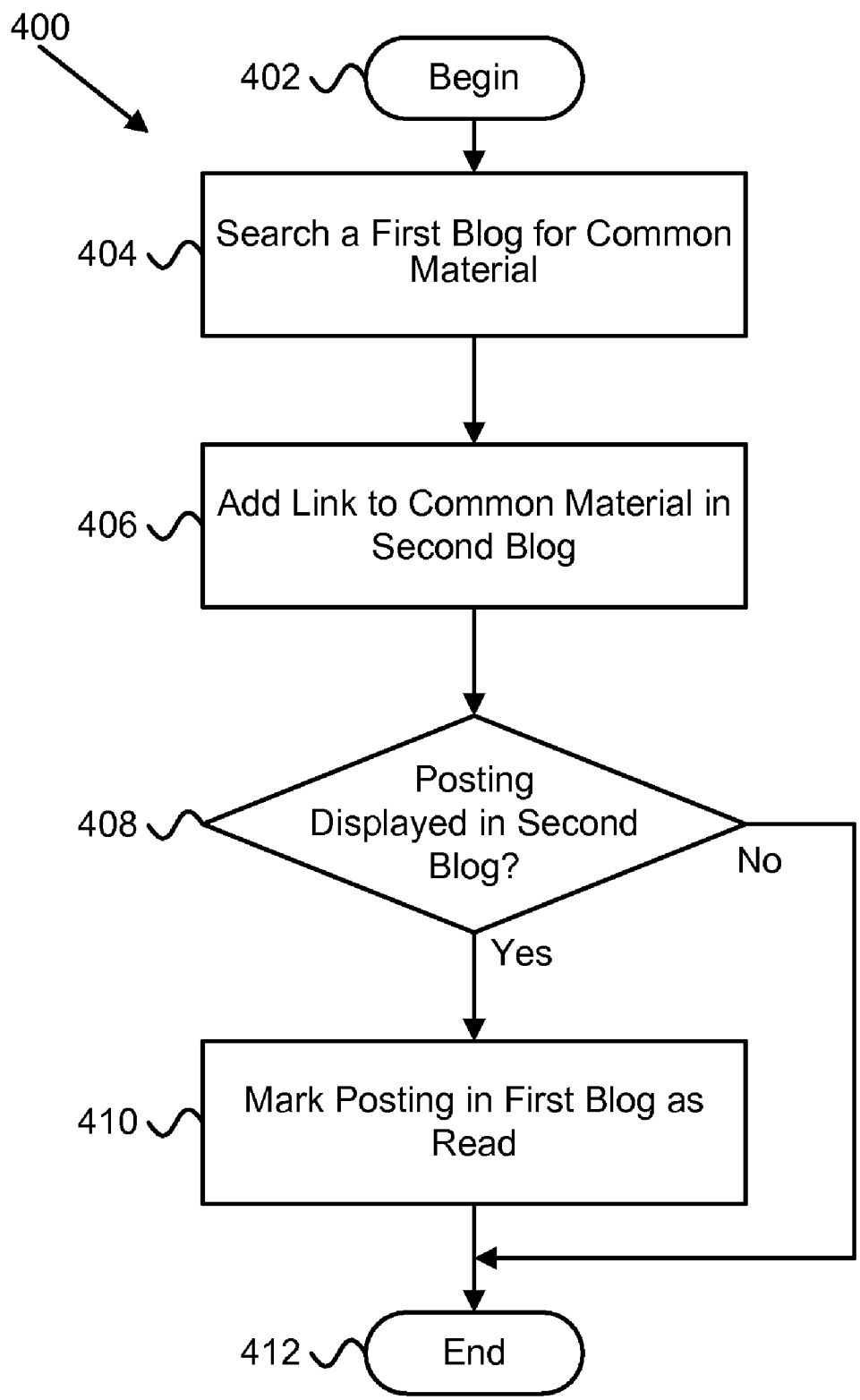
FIG. 4 is a schematic flow chart diagram illustrating one embodiment of a method for an inline display of related blog postings in accordance with the present invention.

FIG. 4 is a schematic flow chart diagram illustrating one embodiment of a method 400 for an inline display of related blog postings in accordance with the present invention. The method 400 begins 402 and the search module 202 searches 404 a first blog for material common to the first blog and to a second blog. In one embodiment, the search module 202 searches 404 a group of blogs identified by the blog grouping module 302 for material in common with a reference blog (second blog).

The linking module 204 adds 406 a link to the common material in the second blog. The link includes an interactive indicator that allows a user to select the indicator to display, through the link, a posting in the first blog that contains the common material. The mark-as-read module 206 then determines 408 if a posting is displayed in the second blog. If the mark-as-read module 206 determines 408 that a posting has been displayed, the mark-as-read module 206 marks 410 in the first blog that the posting has been read and the method 400 ends 412. If the mark-as-read module 206 determines 408 that a posting has not been displayed, the method 400 ends 410 without marking the posting as having been read.

Figure 5:
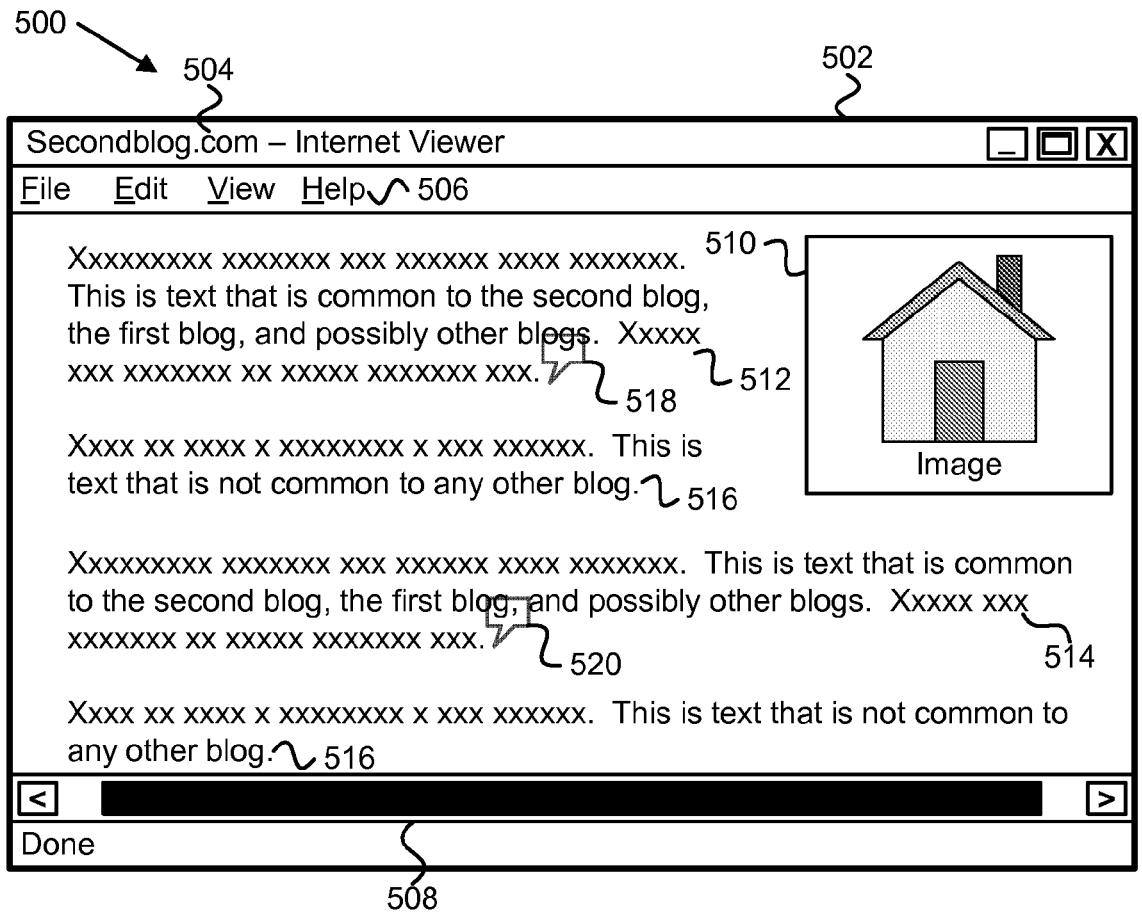
FIG. 5 is an example of a screen display of a blog with an inline display of related blog postings in accordance with the present invention.

FIG. 5 is an example of a screen display 500 of a blog with an inline display of related blog postings in accordance with the present invention. The display 500 depicts a window or page 502 of a typical display program used to access Internet web sites, intra-net sites, etc. where blogs are posted. The window 502, in one embodiment, includes a listing of the name 504 of the blog displayed, which in this example is "Secondblog.com." The window 502 may include a command line 506 with typical commands such as "File," "Edit," "View," "Help," etc., and a scroll bar 508. One of skill in the art will recognize various computer programs and applications capable of displaying a blog with or without commands on a command line 506, scroll bars 508, and other features.

In the example display 500, the secondblog.com blog 504 includes an image 510. A blog may include any material that may be posted to a blog. Any material that may be included in a blog, such as text, images, files, etc. may be searched by the search module 202 to determine if the material is common to more than one blog. The example display 500 also includes common text 512, 514 that is common to another blog along with text 516 that is not common to another blog.

Each section of common text 512, 514 includes an interactive indicator 518, 520. In the example display 500, the interactive tags 518, 520 are transparent bubbles located at the end of the common text 512, 514. In other examples, the indicator 518, 520 may be other symbols or may include the common text 512, 514 highlighted in some way to indicate that the text is different than other text 516. A bubble or symbol may be located in any location convenient to the common text 512, 514, such as at the beginning, middle, end, above, below, to the side, etc. One of skill in the art will recognize other tags 518, 520 that enable a user to follow a link and display a posting of another blog that contains common material.

Figure 6:
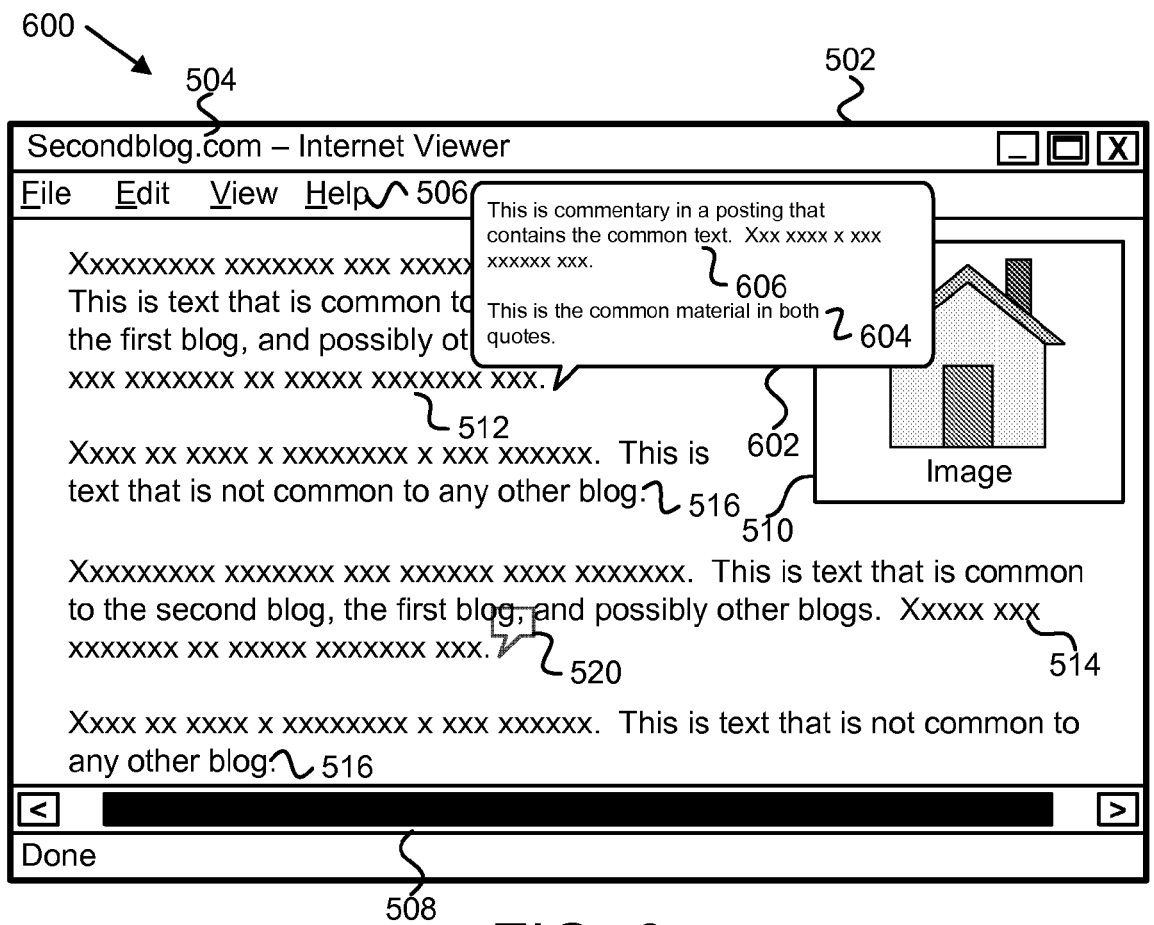
FIG. 6 is an alternate example of a screen display of a blog with an inline display of related blog postings in accordance with the present invention.

FIG. 6 is an alternate example of a screen display 600 of a blog with an inline display of related blog postings in accordance with the present invention. The display 600 includes a window 502, blog name 504, command line 506, scroll bar 508, picture 510, common text 512, 514, other text 516, and bubble 520, substantially similar to those described in relation to FIG. 5. In addition, the display 600 includes an expanded bubble 602 resulting from a bubble (indicator) 520 being selected by a user. The expanded bubble 602 includes a display of a posting in the form of common text 604 and commentary 606 regarding the common text 604. In other embodiments, the expanded bubble 602 may include other material, such as unrelated text, images, file links, etc. that may be part of a posting containing the common material.

Displays other than an expanded bubble are also possible, such as another window, a side bar, viewing pane, etc. One of skill in the art will recognize other ways to display a posting with common material.

Figure 7:
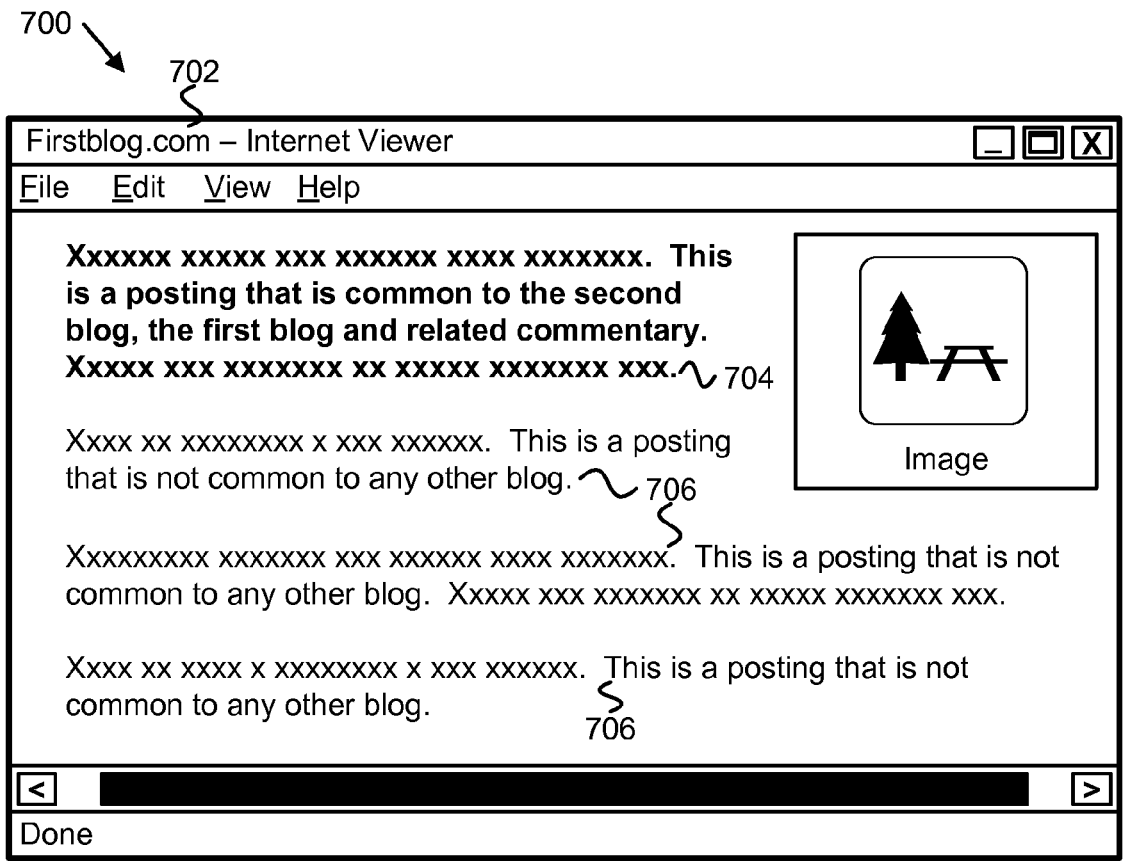
FIG. 7 is an example of a screen display of a related blog posting in accordance with the present invention.

FIG. 7 is an example of a screen display 700 of a related blog posting in accordance with the present invention. The display 700 is similar to the displays 500, 600 depicted in relation to FIGS. 5 and 6, but is of a first, searched blog and includes the name Firstblog.com 702. In addition, the blog includes a posting 704 with common text that is marked as having been read (here depicted as bold text) along with other postings 706. The posting 704 is highlighted as having been read by the mark-as-read module 206 after the posting 704 is displayed in a blog with common text and with an interactive indicator and link to the posting. The posting 704 may be highlighted by changing color, adding a marker, etc. to alert a user that the posting 704 has been read.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising a non-transient computer readable medium having computer usable program code executable to perform operations for an inline display of blog postings, the operations comprising:
   searching a first blog for common material that is found in both the first blog and a second blog, wherein the common material comprises at least one of text, an image, a file, and a link;
   identifying the common material that is found in both the first blog and the second blog;
   automatically adding a link inline in the second blog to the common material in the first blog in response to identifying the common material, wherein the link redirects a user selecting the link in the second blog from the second blog to the first blog, wherein the link comprises an interactive indicator that displays, in the second blog, a posting from the first blog that contains the common material, and wherein the indicator displays the posting without redirecting the user to the first blog in response to a user selecting the indicator; and
   marking each posting in the first blog that contains the common material and that has been displayed for the user in the second blog as having been read by the user in response to the user selecting the indicator, wherein the marking indicates to a user that the common material has already been read.

2. The computer program product of claim 1, wherein the common material is text common to the first blog and the second blog.

3. The computer program product of claim 1, wherein searching a first blog for common material that is common to the first blog and to the second blog further comprises searching postings within the first blog posted after a previous search.

4. The computer program product of claim 1, wherein marking each posting in the first blog that contains the common material as having been read further comprises changing the posting with the common material to a color other than a color of surrounding postings with non-common material.

5. The computer program product of claim 1, wherein selecting the link displays each posting that contains the common material.

6. The computer program product of claim 1, wherein selecting the indicator displays a posting with common material in one of a preview pane, a side bar, a bubble, and a window.

7. The computer program product of claim 1, wherein searching the first blog for material common to the first blog and to the second blog further comprises searching each blog of a group of blogs.

8. The computer program product of claim 7, wherein the interactive indicator further comprises a posting number, wherein the posting number comprises a quantity of postings containing the common material.

9. The computer program product of claim 1, wherein searching the first blog for material common to the first blog and to the second blog further comprises searching after the expiration of a preset time period.

10. The computer program product of claim 1, wherein searching the first blog for material common to the first blog and to the second blog further comprises searching postings that have been posted to the first blog after a previous search.

11. The computer program product of claim 1, further comprising adding a companion link to the common material in the first blog, wherein the companion link comprises an interactive indicator in the first blog that displays a posting from the second blog that contains the common material in response to selection of the indicator.

12. A method for an inline display of blog postings, the method comprising:
   a search module searching, by way of a processor, a first blog for common material that is found in both the first blog and a second blog, wherein the common material comprises at least one of text, an image, a file, and a link;
   the search module identifying the common material that is found in both the first blog and the second blog;
   a link module automatically adding an inline link in the second blog to the common material in the first blog in response to identifying the common material, wherein the link redirects a user selecting the link in the second blog from the second blog to the first blog, wherein the link comprises an interactive indicator that displays, in the second blog, a posting from the first blog that contains the common material, and wherein the indicator displays the posting without redirecting the user to the first blog in response to a user selecting the indicator; and
   a mark-as-read module marking each posting in the first blog that contains the common material and that has been displayed for the user in the second blog as having been read by the user in response to the user selecting the indicator, wherein the marking indicates to a user that the common material that has been marked has already been read.

13. The method of claim 12, further comprising:
   determining customer blogging requirements; and
   installing a computer program for an inline display of blog postings, the computer program comprising the steps of the method of claim 12.

14. The method of claim 13, further comprising installing the computer program on one of a server and a client.

15. The method of claim 12, wherein searching the first blog further comprises searching a group of blogs.

16. The method of claim 12, wherein searching the first blog further comprises searching postings within the first blog posted after a previous search.

17. An apparatus for an inline display of blog postings, the apparatus comprising:

a search module configured to search, by way of a processor, a first blog for common material that is found in both the first blog and a second blog, wherein the common material comprises at least one of text, an image, a file, and a link;

the search module further configured to identify the common material that is found in both the first blog and the second blog;

a linking module configured to automatically add a link inline in the second blog to the common material in the first blog in response to identifying the common material, wherein the link redirects a user selecting the link in the second blog from the second blog to the first blog, wherein the link comprises an interactive indicator that displays, in the second blog, a posting from the first blog that contains the common material, and wherein the indicator displays the posting without redirecting the user to the first blog in response to a user selecting of the indicator; and a mark-as-read module configured to mark each posting in the first blog that contains the common material and that has been displayed for the user in the second blog as having been read by the user in response to the user selecting the indicator, wherein the marking indicates to a user that the common material marked by the mark-as-read module has already been read.

18. The apparatus of claim 17, further comprising a blog grouping module configured to identify a group of blogs and wherein the search module searches blogs in the group of blogs for common material.

19. The apparatus of claim 17, wherein the search module further comprises a refresh module configured with a refresh time, wherein the search module searches the first blog at the expiration of the refresh time.

\* \* \* \* \*